United States Patent

[11] 3,555,258

| [72] | Inventors | Daniel Berthier<br>Grenoble;<br>Jacques Max, Pont De Claix, France |
|---|---|---|
| [21] | Appl. No. | 630,752 |
| [22] | Filed | Apr. 13, 1967 |
| [45] | Patented | Jan. 12, 1971 |
| [73] | Assignee | Commissariat A L'Energie Atomique<br>Paris, France |
| [32] | Priority | Apr. 25, 1966 |
| [33] | | France |
| [31] | | 58933 |

[54] MULTICORRELATOR FOR ANALOG SIGNALS EMPLOYING PULSE WIDTH-AMPLITUDE MULTIPLICATION AND OPERATING IN REAL TIME
8 Claims, 10 Drawing Figs.

[52] U.S. Cl.................................................. 235/181,
235/194; 328/34, 328/37; 324/77; 307/225, 307/241
[51] Int. Cl................................................. G06g 7/19
[50] Field of Search............................................ 235/181, 194, 197; 328/34; 324/77

[56] References Cited
UNITED STATES PATENTS

| 2,643,819 | 6/1953 | Yuk Wing Lee et al. | 235/181 |
| 3,036,775 | 5/1962 | McDermid | 235/181X |
| 3,271,703 | 9/1966 | Kaenel | 235/181X |
| 3,331,955 | 7/1967 | Norsworthy | 235/181 |
| 3,359,409 | 12/1967 | Dryden | 235/181 |

*Primary Examiner*—Eugene G. Botz
*Assistant Examiner*—Felix D. Gruber
*Attorney*—William D. Stokes

ABSTRACT: The correlator comprises two inputs for voltages $X(t)$, $Y(t)$ to be correlated, a conversion unit deducing from $Y(t)$ pulses $\ddot{Y}(t)$, which are width modulated by the amplitude of voltage $Y(t)$, a shifting register with $(n-1)$ stages imparting progressive delay $d_o, 2d_o, \ldots (n-1)d_o$ to pulses $\ddot{Y}(t)$ $n$ pulse width-amplitude multipliers receiving each on one input, from said conversion unit and said shifting register, the undelayed and $(n-1)$ delayed width modulated pulses and on a second input the voltage $X(t)$, and $n$ low-pass filters connected each with the output of one of said multipliers, said filters delivering preferably their outputs successively to an oscilloscope through a switching device.

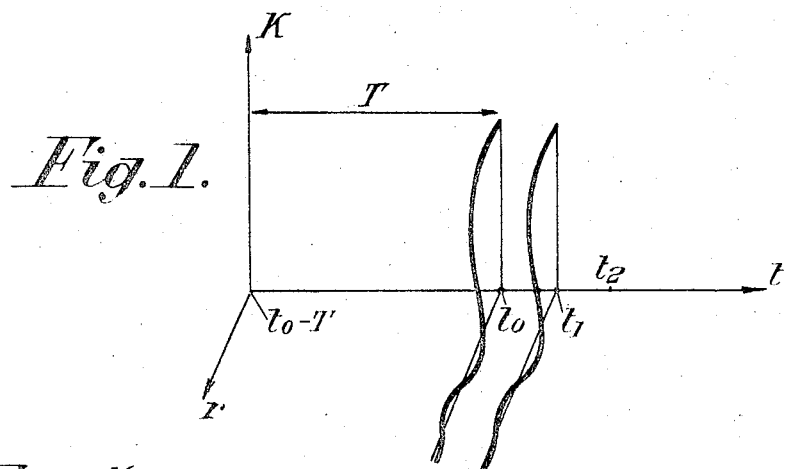
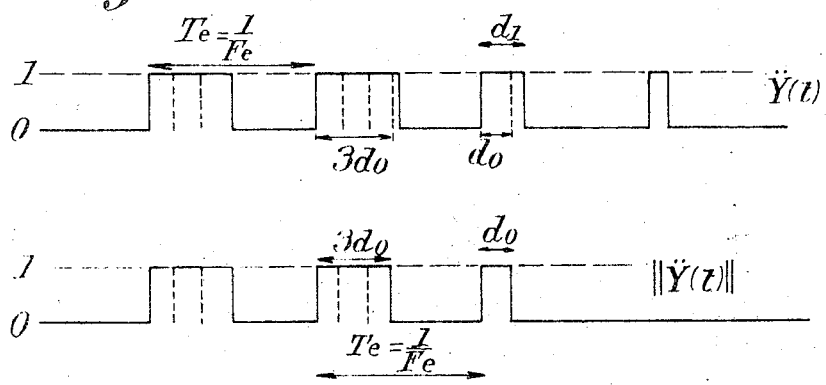
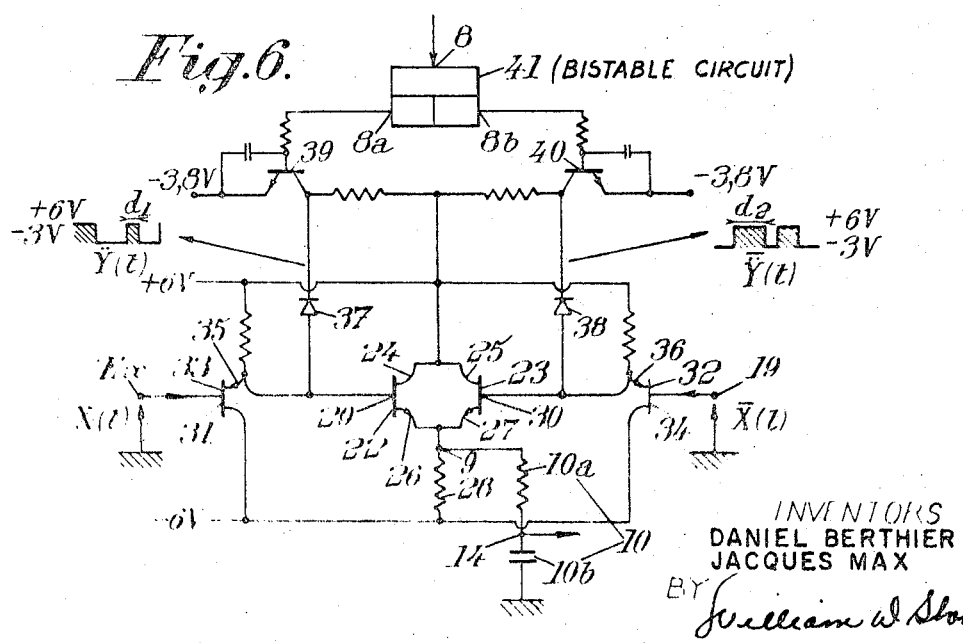
INVENTORS
DANIEL BERTHIER
JACQUES MAX
BY William W. Stokes
ATTORNEY

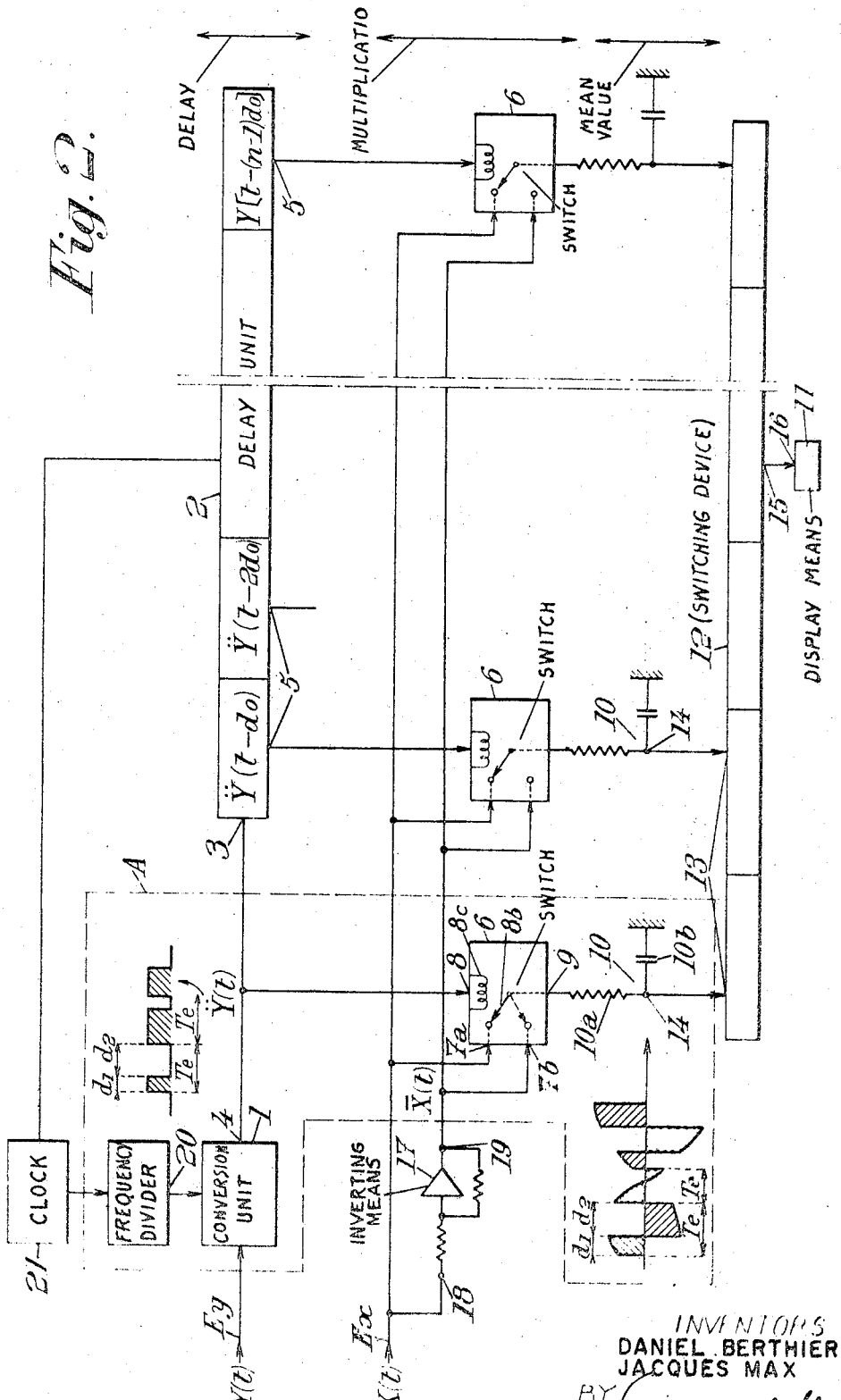

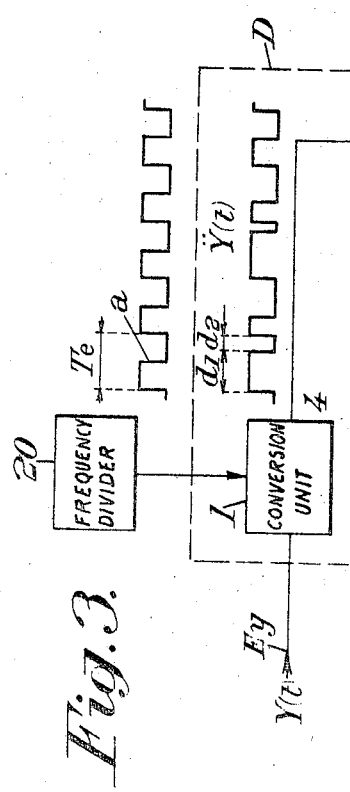
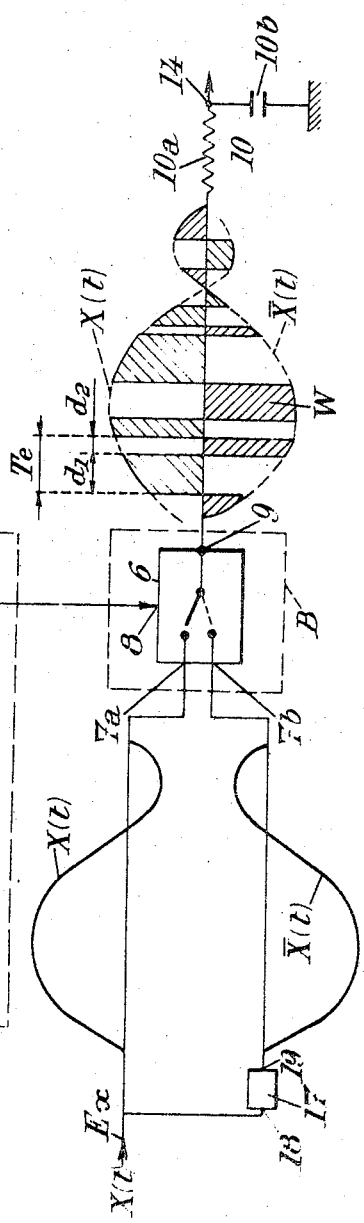
Fig. 4.
Fig. 3.
INVENTORS
DANIEL BERTHIER
JACQUES MAX
BY William W. Stokes
ATTORNEY

MULTICORRELATOR FOR ANALOG SIGNALS EMPLOYING PULSE WIDTH-AMPLITUDE MULTIPLICATION AND OPERATING IN REAL TIME

The present invention relates to correlators, that is to say to apparatus for automatically calculating the following function:

$$K(t_o, T, r) = \frac{1}{T}\int_{t_o-T}^{t_o} X(t) \cdot Y(t-r) dt \quad (1)$$

where $t$ designates time, $t_o$ a particular time, T the measurement time interval, $r$ a variable delay and X and Y two random functions (representing two random physical magnitudes applied to the two input terminals of the apparatus in the form of two voltages, respectively) the statistical properties which vary slowly as a function of time, may (as a first approximation) be considered as constant during a measurement interval T.

If T tends toward infinity and if the ergodicity hypothesis is complied with (for a system having a very great number of degrees of freedom, the statistical mean, at a given time, is equal to the temporal mean, for a given degree), function $K(t_o,T,)$ converges toward the correlation function $$C(r) = E[X(t) \cdot Y(t-r)] = \lim_{T \to \infty} \frac{1}{T}\int_0^T X(t) \cdot Y(t-r) dt$$

E being the symbol of expectation.

On the contrary, if T is not infinite, which is the real case, the measurement time interval being finite, function $K(t_o,T,r)$ is an acceptable estimation of the degree of statistical relation between the functions (or magnitudes) $X(t)$ and $Y(t)$, that is to say of their correlation, as far as there is "local stationarity" (the term stationarity means some permanency, that is to say an invariance when the axis of time undergoes a translation with respect to itself) and "local ergodicity", that is to say ergodicity during time interval T. Under these conditions, determination of function $K(t_o,T,r)$ at successive times $t_o, t_1, t_2 ...$ will make it possible to follow the variations of the correlation of $X(t)$ and $Y(t)$ during time. The appended FIG. 1 shows two curves representative of K for two particular values of $t_o$ and $t_1$.

The invention is more particularly concerned with multicorrelators, i.e. correlators of the multipoint type (relating to many values of $r$, i.e. $r_o, r_1, r_2 ...$) having a wide band and operating in real time.

Such a correlator must therefore supply, with a single measurement for a limited time duration T, a number $n$ of points $(r_o, r_1, r_2...)$ sufficient to permit a correct estimation of function (1), that is to say a sufficient approximation for correlation function (2), which requires performing the three following series of operations:

$(n-1)$ successive delays in one of the channels (the one y, for magnitude Y, for instance for obtaining $Y(t-r)$ of the functions), $n$ multiplications between the values of X and delayed and undelayed Y, obtaining $X(t) \cdot Y(t-r)$, and $n$ integrations (of the products resulting from these multiplications), the results of the integrations, divided by T, being the desired functions.

There is therefore a great number of simultaneous operations to be performed, $n$ being as a rule higher than 50.

The object of the present invention is to provide improvements in such correlators, in particular concerning real time operation with a high working frequency which may reach (and even exceed) one megahertz, while reducing the cost and complication of the apparatus.

As a matter of fact there are, at the present time, two known types of correlators, to wit:

a. analogue correlators wherein the operations (production of delays, multiplications, integrations) are effected on analogue magnitudes; this is a very expensive solution, requiring a complicated mechanical and electronic apparatus, and in particular $(n-1)$ reading heads adapted to be variably offset and $(n-1)$ amplifiers for producing the delays by means of a magnetic loop;

b. digital correlators, wherein all the operations are performed on sampled and quantized values of X and Y, such correlators having the double advantage of a very reliable operation and an easy adjustment, so that they are generally preferred to analogue correlators; however, in this case also the complication and cost of the apparatus increase with $n$.

As a matter of fact, the known correlators, both of the analogue and digital types, become very complicated and very expensive, if they are to be operated in real time, as soon as the working frequency exceeds 10 kHz.

A multicorrelator for $n$ points according to the present invention comprises: two input terminals for two analogue voltages representative of two random magnitudes; a conversion unit receiving the first of said voltages applied to one of the input terminals and deducing therefrom pulses which are width modulated by the amplitude of said first voltage; a shifting register with $(n-1)$ stages imparting progressive delays and connected with its input terminal to the output terminal of said conversion unit for receiving therefrom said width modulated pulses, said register having $(n-1)$ output terminals, one for each stage, the successive output terminals delivering pulses which are respectively delayed, relative to said width modulated pulses arriving on the input terminal of said register, by delays $d_o, 2d_o, ... (n-1) d_o$; $n$ pulse width-amplitude multipliers receiving on one input thereof, from said conversion unit and said delay unit, the undelayed and delayed width modulated pulses and on an other input thereof the second of said voltages, the width-amplitude product of the two incoming pulses appearing at the output of each multipliers; and N LOW-pass filters each connected to the output terminal of one of said multipliers, respectively, and delivering each one of the correlation function for one of said $n$ points.

The device may further include display means for the correlation functions, i.e. K, consisting advantageously of an oscilloscope, and a switching device having on the one hand $n$ input terminals each connected to the output terminal of one of said low-pass filters and on the other hand one output terminal connected with the input terminal of said display means.

Another feature of the invention consists in performing the amplitude to pulse width conversion by means of a sawtooth signal generator, advantageously of the "bootstrap" circuit type working at a frequency which is equal to the ratio of the frequency of the shifting register to an integral number, of an adding unit, advantageously of the type including resistors, adding the sawtooth voltage fed by said generator to the first input voltage applied on the correlator, and of a sign detector, consisting advantageously of an amplifier having a very short time of response, connected with the output of the adding unit.

The invention is more especially concerned with correlators intended to treat, in real time operation, electrical magnitudes representing random physical magnitudes created by nuclear phenomena.

Preferred embodiments of the present invention will be hereinafter described with reference to the appended drawings, given merely by way of example, and in which:

FIG. 1, already mentioned, shows sections through planes $t_o$ and $t_1$ of the surface representing the values of K (plotted on the z axis) as a function of the values of $r$ and $t$ plotted on the $x$ axis and $y$ axis, respectively;

FIG. 2 diagrammatically shows a correlator in accordance with the present invention;

FIG. 3 diagrammatically shows the principle of operation of the portion A of FIG. 2, that is to say a unit for the multiplication of X by Y and a filter for determining the mean value;

FIG. 4 is an explanatory view relating to the operation of FIG. 3;

FIG. 5 illustrates the method of introduction of delays into the correlator of FIG. 2;

FIG. 6 shows an embodiment of the portion B of FIG. 3;

Figure 10:
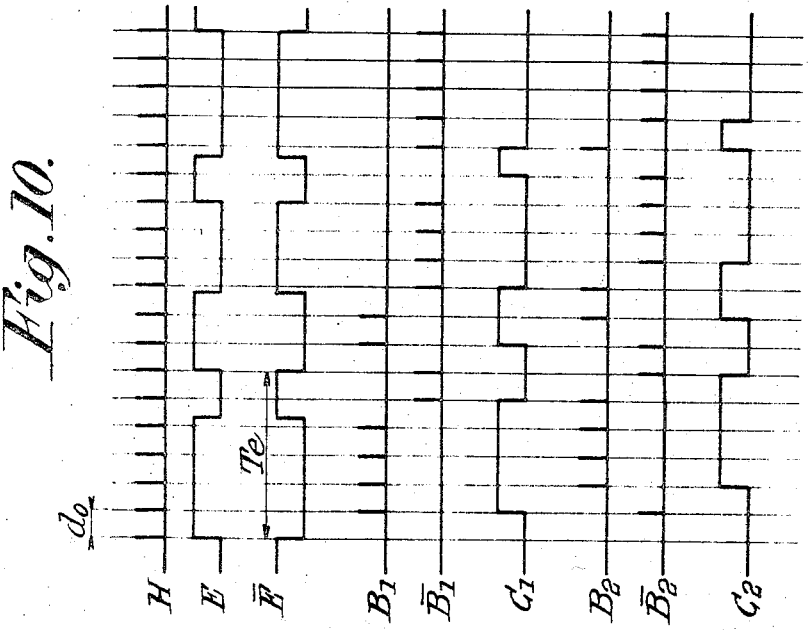
Figure 9:
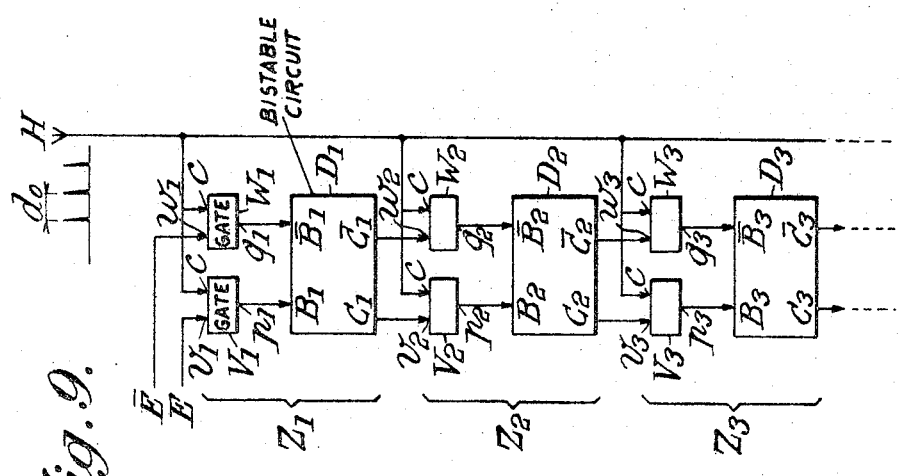

FIG. 9 diagrammatically shows an embodiment of the successive delay unit, in the form of a shifting register provided with gates and bistable circuits; and FIG. 10 is a diagram illustrating the operation of the unit of FIG. 9.

In order to provide a real time wide band multipoint correlator the present invention may be carried out as follows:

FIG. 2 shows a first input $E_y$ for a first analogue voltage $Y(t)$ and a second input $E(x)$ for a second analogue voltage $X(t)$, these two voltages representing two random magnitudes (e.g. random physical magnitudes, created by nuclear phenomena as indicated hereinabove) the correlation between which is to be determined.

The correlator includes:

a conversion unit 1 receiving the first voltage $Y(t)$, applied on input terminal $E_y$, and delivering on its output terminal 4 width modulated pulses, the succession of modulated pulses, designated by $\ddot{Y}(t)$, being represented along unit 1;

a unit 2 having its input terminal 3 connected to output terminal 4 of conversion unit 1 for receiving therefrom said succession of width modulated pulses, said unit being constituted by a shifting register with $(n-1)$ stages so that a pulse applied to its input terminal 3 is time delayed by the successive stages of the shifting register which impart $(n-1)$ successive delays, to wit $d_o, 2d_o, 3d_o \ldots (n-1) d_o$ ($d_o$ being of predetermined duration), the delayed pulses appearing at the $(n-1)$ output terminals 5 of unit 2 as a set of delayed pulses $$\ddot{Y}(t-d_o), \ddot{Y}(t-2d_o), \ldots, \ddot{Y}[t-(n-1)d_o]$$

—$n$ switches 6 for performing $n$ pulse width-amplitude multiplications, said switches including, on the one hand, two signal input terminals 7a and 7b, input terminal 7a receiving the second voltage $X(t)$ applied on input terminal $E_x$, whereas input terminal 7b is connected with the output terminal 19 of a reversing device 17, the input terminal 18 of which is connected with $E_x$, said reversing means 17 deducing from $X(t)$ the negative voltage $\overline{X}(t) = -X(t)$ of same amplitude as $X(t)$ but of opposed polarity, and; on the other hand, at least one switch control input terminal 8 connected, for the first switch (from the left on the drawing), to the output terminal 4 of conversion unit 1 to receive therefrom the pulses $\ddot{Y}(t)$. which have not been delayed and, for each the $(n-1)$ others, to a different one of the $(n-1)$ output terminals 5 of delay unit 2 so as to receive therefrom the $(n-1)$ delayed pulses $$\ddot{Y}(t-d_o) \text{ to } \ddot{Y}[t-(n-1)d_o],$$

every switch 6 is further provided with an output terminal 9 transmitting the voltages applied on the above mentioned input terminals 7a and 7b respectively in response to the feed or absence of feed of current to the corresponding control input terminal 8, coil 8c acting, when excited by the feed of input terminal 8, to bring contact 8b in its operative position (shown in solid line) wherein it is connected with input terminal 7a, whereas when said coil is not excited contact 8b returns in its nonoperative position (shown in dotted lines) wherein it is connected with input terminal 7b; and —$n$ low-pass filters 10 (for instance including each a resistor 10a in series and a capacitor 10b in shunt) each connected to the output terminal 9 of a switch 6 respectively, the output terminals 14 of said filters 10 delivering the correlations functions for each delay;

for example, there are provided display means 11 consisting, in the example shown, of an oscilloscope, and switching means 12 having $n$ input terminals 13, each connected to the output terminal 14 of a low-pass filter and to an output terminal 15 connected to the input terminal 16 of said display means 11.

Multiplication and integration in a unit A of FIG. 2 will now be described more in detail with reference to FIGS. 3 and 4.

Unit A of FIG. 2 is shown on a larger scale in FIG. 3.

The method used for performing multiplication consists in sampling one of the two random magnitudes which are to be correlated that is the magnitude $Y(t)$ which has to be delayed, coding the successive samples of this magnitude by width modulation of pulses, the sampling and coding being performed in conversion unit 1 under the control of frequency divider 20 which is under the dependence of clock 21 of FIG. 2, deducing, from every sample thus coded and referenced $\ddot{Y}(t)$, $(n-1)$ delayed coded samples having delays of $(n-1)$ different durations, respectively, forming an arithmetical progression $d_o, 2d_o, \ldots, (n-1) d_o$, said delays being obtained in the $(n-1)$ stages of shifting register 2 of FIG. 2, multiplying, in parallel, the $n$ successions of samples, to with the succession of samples before a delay is imparted thereto delivered by conversion unit 1 and the $(n-1)$ successions of samples to which delays have been imparted delivered by the $(n-1)$ output terminals 5 of shifting register 2, by the successive values of the other random magnitude, to wit magnitude $X(t)$, still in analogue form, the multiplications being performed by switches 6 by amplitude modulating, in accordance with the actual value of $X(t)$, the pulses already width modulated by he present or past value of $Y(t)$, the areas of the pulses thus twice modulated, i.e. width amplitude modulated, being representative of the product $X(t) \cdot Y(t)$, for a delay equal to zero and for the $(n-1)$ successive delays imparted by shifting register 2 and determining, in parallel, with the filters 6 acting as integrators, the mean values of the areas of the twice modulated pulses of every succession.

FIG. 2 shows a frequency divider unit 20 supplying rectangular signals $\underline{a}$ period $T_e$ and duration $\frac{T_e}{2}$. This frequency divider unit receives, a clock 21 (FIG. 2) which also controls the shifting register 2, pulses of frequency $\frac{Q}{T_e}$, Q being an integer.

FIG. 3 shows, not only the succession of pulses, $\ddot{Y}(t)$, resulting from the width modulation of signal $\underline{a}$ by the amplitude of signal $Y(t)$ (an embodiment of conversion unit 1 for performing this modulation being hereinafter described with its mode of operation with reference to FIGS. 7 and 8), but also the voltage $X(t)$ applied on the input terminal $E_x$ and the opposed voltage $\overline{X}(t)$, deduced from voltage $X(t)$ by reversing device 17.

The two signal inputs 7a and 7b of switch 6 receive $X(t)$ and $\overline{X}(t)$, respectively, whereas control input terminal 8 receives $\ddot{Y}(t)$. Switch 6 transmits the voltage $X(t)$ applied on 7a when a pulse of variable duration $d_1$ of successive $\ddot{Y}(t)$ is applied at 8, thereby exciting coil 8c and bringing contact 8b in the position shown in solid line. Between two such pulses, during variable periods $d_2$, switch 6 transmits, on the contrary, signal $\overline{X}(t)$ contact 8b returns to its position shown in dashed lines when input terminal 8 is no more fed.

FIG. 3 shows the signal issuing at output terminal 9, represented by the waveform W, which comprises pairs of pulses of durations $_1$ and $d_2$ the sum of which is $T_e$, one of the pulses being positive and the other negative (the first pulse is positive when $X(t)$ is positive).

If $d_1 = d_2 = \frac{Te}{2}$ and if signal $X(t)$ varies but little during duration $T_e$, then the mean area during the duration $T_e$ of the impulses of output signal W is zero (this is the case when $Y = o$), the rectangular pulses $\underline{a}$ being width modulated in linear and symmetrical fashion as follows:

$$d_1 = \frac{Te}{2} + KY \tag{3}$$

$$d_2 = \frac{Te}{2} - KY \tag{4}$$

At output 9 there will be obtained pulses of frequency $\frac{1}{Te}$, of amplitude X and $-X$ respectively and of width $d_1$ and $d_2$, respectively.

The mean value M of these pulses during a time $Te$ is given by the following formula $$M = \frac{1}{Te} \int_{t_o-Te}^{t_o} \left[ \left(\frac{Te}{2} + KY(t)\right) X(t) - \left(\frac{Te}{2} - KY(t)\right) X(t) \right] dt$$

so that $$M = \frac{2K}{Te} \int_{t_o-Te}^{t_o} X(t) \cdot Y(t) \cdot dt \quad (5)$$

If $X(t)$ and $Y(t)$ vary but little between times $t_o - Te$ and $t_o$, it is possible to write M under the following form $$M = 2K \cdot X(t_o) \cdot Y(t_o), \quad (6)$$

which represents in fact product X Y both in absolute value and in sign at time $t_o$. Now, in order to calculate function (1) it is not necessary to know the value of X Y at every time, but the mean value of product X Y, i.e.

$$\frac{1}{T} \int_{t_o-T}^{t_o} X(t) \cdot Y(t) dt$$

It is therefore sufficient to calculate the mean area of the pulses of signal W modulated in width and in amplitude during a given duration $T \gg Te$.

This mean area is given by the following formula $$M = \frac{1}{T} \int_{t_o-T}^{t_o} [\sum \text{pulse modulated by } X \text{ and } Y] \, dt \quad (8)$$

In order to simplify, one will call $$d_{1k} = \frac{Te}{2} - KY(kTe) \quad |d_{1k}| \leq Te$$

and $$d_{2k} = \frac{Te}{2} + KY(kTe) \quad |d_{2k}| \leq Te$$

and in this case $M$ may be rewritten as follows:

$$M = \frac{1}{T} \int_0^T \left[ \sum_{k=1}^{N=\frac{T}{Te}} (d_{1k} X(t) - d_{2k} X(t)) \right] dt \quad (9)$$

that is to say $$M = \frac{1}{T} \int_0^T \left[ \sum_{k=1}^{N=\frac{T}{Te}} (d_1 k - d_2 k) X(t) \right] dt \quad (10)$$

Now $d_{1k} - d_{2k}$ represents a function which is equal to zero everywhere but in the interval $$[t = kTe; \; t = kTe + d_{1k} - d_{2k}]$$

where it is equal to 1. This appears on FIG. 4 where $d_{1k} - d_{2k}$ has been plotted in ordinates and time $t$ in abscissas.

If $Z_k(t) = X(t)(d_{1k} - d_{2k})$, $$M = \frac{1}{T} \int_0^T \sum_{k=1}^{N=\frac{T}{Te}} Z_k(t) \cdot dt \quad (11)$$

and in accordance with some hypotheses here verified $$M = \sum_{k=1}^{N=\frac{T}{Te}} \frac{1}{T} \int_0^T Z_k(t) \cdot dt \quad (12)$$

$Z_k$ being zero except in the interval $[kTe; (k+1)Te[$ $$M = \underbrace{\frac{1}{N} \sum_{k=1}^{N=\frac{T}{Te}}}_{\text{mean value}} \underbrace{\frac{1}{Te} \int_{kTe}^{(k+1)Te} Z_k(t) dt}_{\substack{\text{value of product} \\ XY \text{ within the} \\ \text{interval } [kTe; \\ (k+1)Te[}} \quad (13)$$

As it is supposed, $X(t)$ and $Y(t)$ vary but little between two successive samples so that $$M = \simeq \sum_{k=1}^{N} X(t = kTe) \cdot Y(t = kTe) \quad (14)$$

Finally the mean value of samples $Z_k(t)$ is obtained at point 14 at the output terminal of low-pass filter 10.

Concerning the insertion of the successive delays in arithmetical progression of ratio $d_o$, this is advantageously performed, as above stated, in a shifting register 2 which performs not only the introduction of the delays but also a quantization (as hereinafter explained more in detail with reference to FIGS. 9 and 10).

If $Fe = \frac{1}{Te}$ is the frequency of the width modulated pulses representative of $Y(t)$, if it is desired to retain the information concerning width $d_1$ (and also that of its complement $d_2$ with respect to $Te$), the transfer frequency $Fr = \frac{1}{d_o}$ of the shifting register must be at least equal to $Fe(Fr \geq Fe)$ Furthermore, $d_1$ may have, in the register, only discrete values which are multiples of $d_o$ ($d_1 = md_o$, $m$ being an integer) and its maximal value is $Te$.

The upper portion of FIG. 5 shows the pulses entering shifting register 2, these pulses representing successive sampled values of $Y(t)$ and thus constituting succession $\overset{\vee}{Y}(t)$. Their frequency is equal to $Te = \frac{1}{Fe}$. Their variable width is equal to $d_1$, which may have any value ranging from 0 to $Te$. The lower portion of FIG. 5 shows the pulses issuing from register 2, the period of which is also $Te = \frac{1}{Fe}$, but the width of which is quantized. It is also equal to $m.d_o$, $m$ having one of the values 0,1,2,3, .... Q, Q being an integer. $||\overset{\vee}{Y}(t)||$ designates the quantized output of register 2.

In order to simplify FIG. 5, the delay inserted has not been considered, the output pulses being shown just under the input pulses. In the case of FIG. 5 it has been supposed that the transfer frequency Fr of register 2 is equal to six times frequency $Fe(Q=6)$.

It will therefore be seen that finally the output signal $||\overset{\vee}{Y}(t)||$ is quantized at (Q+1) levels, Q being the ratio of the register transfer frequency to the sampling frequency:

$$Q = \frac{Fr}{Fe}.$$

Thus, for a given frequency Fr, the product of the sampling frequency by the number of quantization levels is constant (Fe Q=constant).

This delay system, constituted by shifting register 2 with $(n-1)$ stages, has the advantage of being very simple to carry out because it does not require any particular conversion from the analogue system to the digital system or the reverse to delay the $\overset{\vee}{Y}(t)$ pulses, width modulated by Y, of variable width $d_1$. The $(n-1)$ output terminals 5 of shifting register 2 may act directly on the input terminals 8 of $(n-1)$ switches 6 acting as multipliers.

FIG. 6 shows an embodiment, by way of example only, of the unit B of FIG. 3, with the addition of low-pass filter 10.

The switch according to FIG. 6 has the following characteristics:

switching frequency up to 250 kHz.,
analogue input (either direct or alternating),
good dynamics,
relatively simple construction for its use in each of the $n$ channels of the correlator (n>50).

In FIG. 6 the switch comprises two NPN transistors 22 and 23, the collectors 24 and 25 of which are connected together and the emitters 26 and 27 of which are connected to a common load resistor 28, the output terminal being at 9 where is connected the low-pass filter 10 including a series resistor 10a and a shunt capacitor 10b, the integrated signal being available at output terminal 14.

The input signal X(t) available at input terminal Ex and the input signal $\overline{X}(t)$ (to wit the signal opposed to X) available at point 19 are applied on the bases 29 and 30 of transistors 22 and 23 through PNP transistors 31 and 32 the bases 33 and 34 of which are connected to input terminal Ex and point 19 respectively whereas their emitters 35 and 36 are connected to bases 29 and 30, respectively.

The switch control signals, opposed in phase, are applied, through diodes 37 and 38, also on the bases 29 and 30 of transistors 22 and 23.

It suffices alternately to block, through signals applied through diodes 37 and 38, one transistor 22 or 23 and then the other to obtain, at the output 9 of the switch, with a gain substantially equal to one, the voltage applied on the base 29 or 30 of the transistor 22 or 23 that is conductive, to wit alternately voltages X(t) and $\overline{X}(t)$, that is to say exactly what is desired. It will be noted that the influence of the blocked transistor 31 or 32, in shunt with the conductive transistor 22 or 23, is negligible.

When diode 37 is blocked, transistors 22 and 31 are conductive whereas transistors 23 and 32 are blocked. On the contrary, when diode 38 is blocked, transistors 23 and 32 are conductive whereas transistors 22 and 31 are blocked. Control is performed by means of square-shaped waveforms of amplitude +6 volts and −3 volts, in phase opposition obtained (through transistors 39 and 40) from the outputs 8a and 8b of a bistable circuit 41 supplying 0 and −6 volts square waveforms in the blocked and conductive state, respectively, this bistable circuit receiving, on its input 8, the signal $\dot{Y}(t)$ delivered at the output of conversion unit 1 shown by FIGS. 2 and 3.

The following table indicates the states of the diodes and transistors and of their input and output terminal in the two possible cases with square waveforms of −3 volts and +6 volts on the diode input terminals:

|  | Case 1 | Case 2 |
| --- | --- | --- |
| Input 37 | −3 volts | +6 volts. |
| Input 31 | Blocked | Conductive. |
| Output 31 | $|X|\leq 3V$ | $|X|\leq 3V$. |
| Output 22 | Blocked | Conductive. |
| Input 38 | +6 volts | −3 vlts. |
| Input 32 | Conductive | Blocked. |
| Output 32 | $|\overline{X}|\leq 3V$ | $|\overline{X}|\leq 3V$. |
| Output 23 | Conductive | Blocked. |
| Input 9 | $\overline{X}$ | X. |

For the pairs of transistors 22 and 31, on the one hand, and 23 and 32, on the other hand, choice has been made of complementary silicon transistors (2N 2904 and 2N 2221) which permit of obtaining a zero voltage at the output at point 9 when the inputs Ex and 19 are at a potential equal to zero.

The fluctuations at the output 14 of low-pass filter 10 are of an amplitude at most equal to 1 mV (for an observation over 12 hours) when points Ex and 19 are grounded. The maximum voltage at 9 is ±3 volts.

The use of complementary silicon transistors also has the advantage of reducing the influence of temperature variations upon voltage fluctuations at 9, the voltage variations of the base-emitter junction of transistor 31 (or 32) being compensated for by those of transistor 32 (or 33).

A maximum amplitude of 3 volts as limit in view of the base-emitter breaking voltage of the transistors that are used. The switching rate, which is 250 kHz, with transistors 2N 2904 and 2N 2221 may be increased by making use of faster transistors. The embodiment shown in FIG. 6 is the electronic equivalent or version of the electromechanical simplified embodiment of switch 6 of FIG. 2, in both cases the electric path between Ex and 9 being closed or conductive when input terminal 8 is fed, but open or blocked when input terminal 8 is not fed, whereas the electric path between 19 and 9 is closed or conductive when input terminal 8 is not fed, but open or blocked when input terminal 8 is fed.

Figure 7:
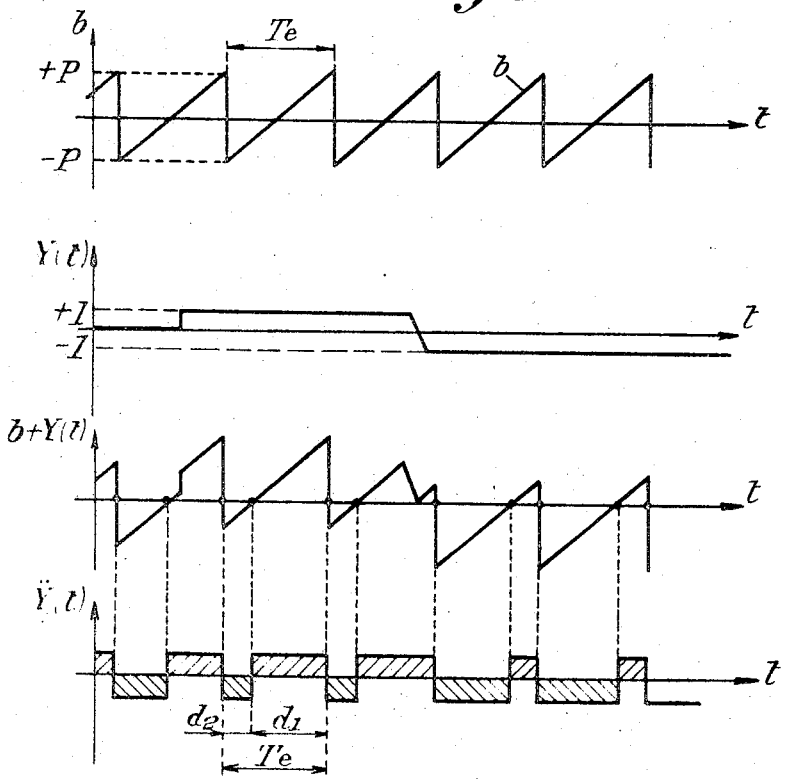
FIG. 7 illustrates the amplitude to time conversion which may be carried out in the diagram of FIG. 3.
Figure 8:
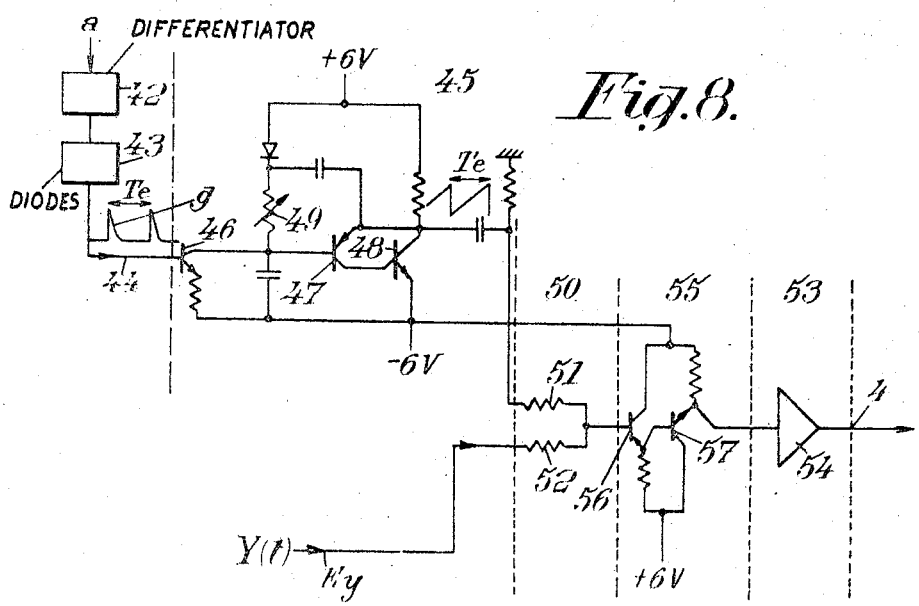
FIG. 8 shows an embodiment of the portion D of FIG. 3, to wit the device for converting amplitude into time according to the method illustrated by FIG. 7.

To complete the explanations concerning the operation and the construction of the correlator of FIG. 2, FIGS. 7 and 8 illustrate how width modulation is performed. It will be reminded that is is desired to obtain a linear and symmetrical width modulation as a function of the amplitude of signal Y(t), width $d_1$ being a linear function of Y (see the above formulas (3) and (4)).

In the preferred embodiment, this modulation is performed by a centered sawtooth signal, as linear as possible, shown at b by the first curve of FIG. 7 (on the different portions of which time t is plotted in abscissas and the signal amplitudes in ordinates), the period of this signal being Te and its amplitude ranging from −p to +p, p depending upon the maximum amplitude of signal Y(t).

The method of modulation consists in adding to the sawtooth signal b signal Y, a very simple example of which is given by the second curve of FIG. 7 (in this example it is supposed that Y merely passes from value 0 to value +1, then to value −1).

The sum of signals b and Y(t) is given by the third curve of FIG. 7. It suffices to effect a sign detection on this last curve to obtain signal $\dot{Y}(t)$ comprising a succession of positive pulses of width $d_1$ with, between them, negative pulses of width $d_2$, the period being constant and equal to Te. This curve is shown at the bottom of FIG. 7.

FIG. 8 shows a preferred embodiment of the conversion unit 1 of FIGS. 2 and 3 for carrying out the process of modulation described with reference to FIG. 7.

Rectangular signals a, of period Te (see FIG. 3) are first differentiated in a differentiator 42 which transforms the wavefronts of square waves a into positive peaks and the rear edges of said square waves into negative peaks. These pairs of peaks are applied on a system of diodes 43 which passes only the positive peaks g which attack the input 44 of sawtooth generator 45 with the recurrence period Te.

Sawtooth generator 45, which transforms pulses g into signals b of the type shown by FIG. 7 (first line) is a bootstrap circuit (as known in the art) and it comprises three transistors 46, 47 and 48 and a variable resistor 49 making it possible to adjust the amplitude variation from −P to +P of the output signals b.

An adding device 50, including resistor 51 which receives signals b and resistor 52 which receives signals Y(t) deduces from these two input signals the addition signal illustrated by the third line of FIG. 7. The gain of this adding device is one-half.

Sign detection is performed in a sign detector 53 consisting of an amplifier 54 having a very short time of response for instance one of the μA710 type made by the Fairchild Corporation, the time of response of which is about 40 nonoseconds.

Between adding device 50 and sign detector 53 there is provided an impedance matching unit 55 which essentially comprises two transistors 56 and 57 arranged in emitter-follower fashion.

At the output 4 of sign detector 53 there is finally obtained the signal $\dot{Y}(t)$ shown by FIGS. 2 and 3 on the one hand, and by FIG. 7 (fourth line) on the other hand.

When the amplitude of Y is greater than the amplitude P of the sawteeth, in absolute value, one of the two widths, $d_1$ or $d_2$, becomes zero, the other corresponding to the whole duration Te and thereby becoming infinite. Switches 6 then remain in the same position or condition as long as Y(t) does not return to a value lower than P in absolute value. The switches then play the part of analogue electronic gates, the system behaving as a single channel clipping correlator or sign detection correlator.

The correlator described up to now with reference to the drawings therefore comprises a channel Y(t) sampled at a frequency $Fe = \frac{1}{Te}$. The signal pass-band may be of the order of 0.1 $Fe$ with a precision of the order of 5 percent.

As above stated, the rate of switching may reach 250 kHz. with the transistors that are used (2N 2904 for transistors 31 and 32, 2N 2221 for transistors 22, 23, 39 and 40, 2N 914 for transistors 46, 48 and 57, 2N 711 for transistors 47 and 2N 1132 for transistor 56), diodes 37 and 38 being of the FD 100 type. With faster diodes and transistors (of the high frequency type) it would be possible to provide a correlator of a switching frequency of 100 MHz. therefore of a pass-band of the order of 1 MHz.

To complete the description of a preferred embodiment of a correlator according to the invention, further explanations will now be given, with reference to FIGS. 9 and 10, concerning unit 2.

The shifting register of FIG. 9 imparting successive delays in its ($n-1$) stages a series of elements $Z_1, Z_2, Z_3, \ldots$ each of which comprises, on the one hand, a bistable circuit $D_1, D_2, D_3 \ldots$ with two opposed input terminals $B_1, \overline{B}_1; B_2, \overline{B}_2; B_3, \overline{B}_3; \ldots$ and two opposed output terminals $C_1, \overline{C}_1; C_2, \overline{C}_2; C_3, \overline{C}_3; \ldots$, and, on the other hand, a pair of gates $V_1, W_1; V_2, W_2; V_3, W_3; \ldots$ with a signal input terminal $c$, a control input terminal $v_1, w_1; v_2, w_2; v_3, w_3; \ldots$ and an output terminal $p_1, q_1; p_2, q_2; p_3, q_3; \ldots$ All the signal input terminals $c$ receive pulses from clock H spaced from one another by $d_o$ the value of which has been indicated above, whereas the control input terminals $v$, $w$ of every bistable circuit (with the exception of that of the first element $Z_1$) are connected with the output terminals C, $\overline{C}$, respectively, of the preceding bistable circuit. Thus $v_2$ is connected with output terminal $C_1$ and $w_2$ with output terminal $\overline{C}_1$; $v_3$ is connected with output terminal $C_2$ and $w_3$ with output terminal $\overline{C}_2$. On the contrary, in the first element $Z_1$, gates $V_1$ and $W_1$ receive, on the signal input terminals $v_1$ and $w_1$ thereof, respectively, the signal E to be delayed and the opposed or negative value $\overline{E}$ thereof, of the same amplitude but of opposed polarity, signal E being in fact one of the signals of the succession $\ddot{Y}(t)$ of FIG. 2 $\overline{E}=E$ is deduced from E by a reversing device (not shown).

The operation of the register of FIG. 9 is as follows, reference being made to FIG. 10 which shows some pulses and signals.

The signal to be delayed E, representing the width modulated pulses, and the complement or negative $\overline{E}$ thereof direct the transfer pulses H, coming in particular from clock 21 of period $d_o$ onto the opposed input terminals $B_1$ or $\overline{B}_1$ of the two transistors of the first bistable circuit $D_1$ through the two gate circuits $V_1$ and $W_1$. Thus bistable circuit shifts from state zero to state one, or inversely, only when a pulse H is coming in and it remains in its state until the pulses H change of input terminal $B_1$ or $\overline{B}_1$ by interchanging of the open state between the two gates $V_1$ and $W_1$ when there is a change of polarity of signal E and therefore also of signal $\overline{E}$.

FIG. 10 shows the short pulses H of period $d_o$, the signals E and $\overline{E}$ (the latter being opposed to or complementary of E), then at $B_1, \overline{B}_1, C_1, B_2, \overline{B}_2$ and $C_2$ the signals and pulses passing the corresponding input B or output terminals C.

Thus, at $C_1$ for instance one finds signal E delayed by $d_o$ and temporarily quantized with a quantization constant equal to $d_o$.

This delaying effect is repeated for every element Z, as shown by FIG. 10. Thus at $C_2$ signal E is delayed by $2d_o$ and of course quantized.

After n elements Z, signal E is delayed by $nd_0$.

Thus is obtained the quantized delaying the importance of which has been above explained with reference to FIG. 5.

In a preferred embodiment, every element Z, including a bistable circuit D and two gate circuits V, W, is of the solid state type and consists of an integrated circuit (for instance a bistable circuit of the $FF_2$ "Fransco" type).

The multipoint correlator according to the present invention, as above described, has, with respect to the existing correlators of the same type many advantages and, in particular, the following ones:

First, it can work in real time with a high number of points, for instance with a number of points higher than 50.

Its working frequency is very high and it can reach and even exceed one megahertz.

The complication and cost of the apparatus are reduced, in particular for introducing delays in arithmetical progression i.e. $d_o, 2d_o, 3d_0, \ldots (n-1) d_0$, n being the number of points.

Its dynamics is good and it is little responsive to background noise and temperature variations.

In a general manner, while the above description discloses what are deemed to be practical and efficient embodiments of the present invention, said invention is not limited thereto as there might be changes made in the arrangement, disposition and form of the parts without departing from the principle of the invention (as comprehended within the scope of the appended claims.)

We claim:

1. A multicorrelator determining the correlation function between a first and a second randomly variable physical magnitude, for a plurality of n points, comprising:

A first general input terminal for a first variable voltage, the variable amplitude of which represents said first magnitude;

a second general input terminal for a second variable voltage, the variable amplitude of which represents said second magnitude;

sampling and modulating means having a signal input terminal connected to said first general input terminal, for receiving said first variable voltage therefrom, and an output terminal, said means deducing, from said first variable voltage applied to its input terminal, a succession of pulses which are width modulated by the variable amplitude of said first voltage, said succession of pulses being delivered on said output terminal;

a shifting register having ($n-1$) stages and including an input terminal connected to said output terminal of said sampling and modulating means, for receiving said succession of width modulated pulses therefrom, and ($n-1$) output terminals, one for each stage thereof, said ($n-1$) stages imparting to each the same time delay to said pulses so that the ($n-1$) output terminals of the successive stages deliver successions of pulses with delays equal to said delay, twice said time delay, three times said time delay, ...... ($n-1$) times said time delay respectively;

n pulse width-amplitude multipliers, having each a first input terminal connected to said second general input terminal, for receiving said second variable voltage therefrom, and a second input terminal connected to a different one of the following output terminals: the output terminal of said sampling and modulating means and the ($n-1$) output terminals of said shifting register, each of said multipliers delivering a succession of alternate even and odd pulses having an amplitude proportional to the amplitude of the second variable voltage received on the first input thereof, the odd pulses having the polarity of said second variable voltage and the duration of the width modulated pulses arriving on said second input thereof, whereas the even pulses have a polarity opposed to the polarity of said second variable voltage and the duration of the intervals between the width modulated pulses arriving on said second input thereof; and n low-pass filters having each one an input terminal connected with a said output terminal of a different one among said n multipliers, for receiving one of said successions of alternate pulses therefrom, and an output terminal delivering each the correlation function for a different one of said n points.

2. A multicorrelator determining the correlation function between a first and a second randomly variable physical magnitude; for a plurality of $n$ points, comprising:

a first general input terminal for a first variable voltage, the variable amplitude of which represents said first magnitude;

a second general input terminal for a second variable voltage, the variable amplitude of which represents said second magnitude;

sampling and modulating means having a signal input terminal connected to said first general input terminal, for receiving said first variable voltage therefrom, and an output terminal, said means deducing, from said first variable voltage applied to its input terminal, a succession of pulses which are width modulated by the variable amplitude of said first voltage, said succession of pulses being delivered on said output terminal;

a shifting register having $(n-1)$ stages and including an input terminal connected to said output terminal of said sampling and modulating means, for receiving said succession of width modulated pulses therefrom, and $(n-1)$ output terminals, one for each stage thereof, said $(n-1)$ stages imparting to each the same time delay to said pulses so that the $(n-1)$ output terminals of the successive stages deliver successions of pulses with delays equal to said time delay, twice said time delay, three times said time delay, ..... $(n-1)$ times said time delay respectively;

a reversing unit with an input terminal connected to said second general input terminal, for receiving the second variable voltage therefrom and an output terminal delivering a third variable voltage which has the same amplitude as said second variable voltage, but an opposite polarity;

$n$ switches having a first signal input terminal connected to said first general input terminal, for receiving said second variable voltage therefrom, a second signal input terminal connected to said output terminal of said reversing unit, for receiving said third variable voltage therefrom, a control input terminal connected to the output terminal of said sampling and modulation means, for receiving said succession of alternate pulses therefrom, and an output terminal, each of said switches connecting said output terminal thereof to said first signal input terminal thereof, in response to a pulse in said succession applied on the control input terminal thereof, but to said second signal input terminal in the absence of a pulse in said succession applied on the control input terminal thereof, each of said switches delivering a succession of alternate even and odd pulses having an amplitude proportional to the amplitude of the second variable voltage received on the first input thereof, the odd pulses having the polarity of said second variable voltage and the duration of the width modulated pulses arriving on said second input thereof, whereas the even pulses have a polarity opposed to the polarity of said second variable voltage and the duration of the intervals between the width modulated pulses arriving on said second input thereof; and $n$ low-pass filters having each one an input terminal connected with a said output terminal of a different one among said $n$ multipliers, for receiving one of said successions of alternate pulses therefrom; and an output terminal delivering each the correlation function for a different one of said $n$ points.

3. A multicorrelator according to claim 2, further comprising display means with an input terminal, and a switching device having $n$ input terminals, each connected to the output terminal of a different one among said low-pass filters, and one output terminal connected with the input terminal of said display means, said switching device connecting successively and cyclically each of its input terminals to its output terminal.

4. A multicorrelator according to claim 2, wherein the width of pulses in the succession of pulses delivered by said sampling and modulating means, as well as by said shifting register, is an integral multiple of the reciprocal of the transfer frequency of said shifting register.

5. A multicorrelator according to claim 2, wherein said shifting register cooperates with a clock delivering on its output terminal regularly spaced clock pulses and, with an inverter having an input terminal connected to said output of said sampling and modulating means, for receiving said succession of pulses, and an output terminal delivering a succession of pulses of same amplitude and duration but of opposite polarity as compared with the received succession of pulses, and wherein each of said $(n-1)$ stages of said shifting register comprises a bistable circuit, including two input terminals and two output terminals, and two gates, each of said gates including two input terminals, and one output terminal, one input terminal of each of said gates being connected with said output terminal of said clock, to receive said clock pulses therefrom, the other input terminal of each of said gates, with the exception of the gates belonging to the first stage, being connected with one output terminal, respectively, of the bistable circuit of the preceding stage, the other input terminal of the gates of the first stage being connected, respectively, to said output terminal of said sampling and modulating means and to the output terminal of said inverter, the output terminals of each of said gates being connected, respectively, with the input terminals of the bistable circuit of the corresponding stage.

6. A multicorrelator according to claim 2, wherein said reversing unit comprises, for each of said $n$ switches, a bistable circuit with an input terminal connected to said output terminal of said sampling and modulating means, for receiving said succession of pulses, a first output terminal delivering said pulses and a second output terminal delivering a succession of pulses corresponding to the absence of pulses in the received succession of pulses, and wherein each of said switches comprises two transistors having a common collector, a common load resistor connected with the emitters of said transistors, the output terminal of said switch being collected from the emitters of said transistors and a diode for each of said transistors receiving the output of said first and said second output terminal of said bistable circuit respectively, the base of each of said transistors being connected, on the one hand, to the corresponding diode and, on the other hand, to said second general input receiving said second voltage.

7. A multicorrelator according to claim 6, further comprising a transistor connecting the base of each of said two transistors with said first and said second signal input of said $n$ switches.

8. A multicorrelator according to claim 2, wherein said sampling and modulating means comprises a sawtooth signal generator adapted to operate at a frequency equal to the frequency of said shifting register divided by an integer, an adding device for adding together the sawtooth voltage supplied by said generator and said first voltage and a sign detector connected to the output of said adding device.